(12) United States Patent
Trejo Córdova et al.

(10) Patent No.: US 10,793,960 B2
(45) Date of Patent: Oct. 6, 2020

(54) ELECTROLYTIC BATH FOR PRODUCING ANTIBACTERIAL METAL COMPOSITE COATINGS OF ANTIBACTERIAL ZINC METAL PARTICLES (ZN/PMA)

(71) Applicant: CENTRO DE INVESTIGACIÓN Y DESARROLLO TECNOLÓGICO EN ELECTROQUÍMICA, S.C., Pedro Escobedo, Querétaro (MX)

(72) Inventors: Gabriel Trejo Córdova, Querétaro (MX); Yunny Meas Vong, Querétaro (MX); Raúl Martin Ortega Borges, Querétaro (MX)

(73) Assignee: CENTRO DE INVESTIGACIÓN Y DESARROLLO TECNOLÓGICO EN ELECTROQUÍMICA, S.C., Querétaro (MX)

( * ) Notice: Subject to any disclaimer, the term of this patent is extended or adjusted under 35 U.S.C. 154(b) by 416 days.

(21) Appl. No.: 15/568,519

(22) PCT Filed: Dec. 10, 2015

(86) PCT No.: PCT/IB2015/059522
§ 371 (c)(1),
(2) Date: Mar. 12, 2018

(87) PCT Pub. No.: WO2016/170408
PCT Pub. Date: Oct. 27, 2016

(65) Prior Publication Data
US 2018/0195190 A1 Jul. 12, 2018

(30) Foreign Application Priority Data
Apr. 23, 2015 (MX) .................. MX/A/2015/005364

(51) Int. Cl.
C25D 15/00 (2006.01)
C25D 3/22 (2006.01)
B82Y 30/00 (2011.01)

(52) U.S. Cl.
CPC ............... *C25D 3/22* (2013.01); *C25D 15/00* (2013.01); *B82Y 30/00* (2013.01)

(58) Field of Classification Search
CPC ..................................................... C25D 15/00
USPC .......................................................... 205/109
See application file for complete search history.

(56) References Cited

PUBLICATIONS

Reyes-Vidal et al., Electrodeposition, Characterization, and Antibacterial Activity of Zinc/Silver Particle Composite Coatings, Applied Surface Science (2015), vol. 342, pp. 34-41. (Year: 2015).*
Kumar et al., Morphological and Electrochemical Characterization of Electrodeposited Zn—Ag Nanoparticle Composite Coatings, Materials Characterization (2013), vol. 85, pp. 82-91. (Year: 2013).*

* cited by examiner

*Primary Examiner* — Edna Wong
(74) *Attorney, Agent, or Firm* — Browdy and Neimark, PLLC

(57) ABSTRACT

The invention relates to the use of an electrolytic bath for electroplating zinc-particles metal composite coatings of metals with antibacterial ability, which inhibits bacteria growth such as Escherichia coli and Staphylococcus aureus, at least by 87% over its surface. The method of formulating an electrolytic bath that allows the production of antibacterial coatings involves: a) adding metal particles with antibacterial ability suspended in a cationic surfactant to an electrolytic bath containing boric acid, chlorides, polyethylene glycol, benzylideneacetone, sodium benzoate, triethanolamine and dissolved $Zn^{2+}$ salts; b) electroplating the metal composite coating of zinc-antibacterial metal particles by applying direct current density. The occlusion of metal nanoparticles with antibacterial ability in the coating matrix provides a coating with antibacterial characteristics.

23 Claims, No Drawings

ELECTROLYTIC BATH FOR PRODUCING ANTIBACTERIAL METAL COMPOSITE COATINGS OF ANTIBACTERIAL ZINC METAL PARTICLES (ZN/PMA)

TECHNICAL FIELD OF THE INVENTION

The present invention relates to zinc (Zn) coatings containing occluded and homogeneously dispersed antibacterial metal agents throughout the coating, more specifically to an electrolytic bath composition to obtain an antibacterial metal coating of Zinc-antibacterial metal particles (Zn/AMPs). The metal coatings include decorative electroplated coatings for bathrooms, kitchen accessories, hand rails, shopping carts and other highly polished products in which antibacterial protection is necessary; wherein Zinc coatings has the particularity of not producing allergies as those that may arise with Nickel coatings.

OBJECTIVES OF THE INVENTION

The main objective of the present invention is to provide an electrolytic bath that allows Zn-AMP metal composite coatings to be obtained through electroplating, whose antibacterial metal particles (AMPs) are occluded and homogeneously dispersed in the coating.

The second objective of the present invention is to avoid allergies that have been reported in other types of metal coatings such as nickel coatings.

The third objective of the present invention is to provide composite coatings of Zinc-antibacterial metal particles (Zn/AMPs) which prevent and inhibit bacteria growth, and/or remove both bacteria types: Gram-negative such as *Escherichia coli*, and Gram-positive such as *Staphylococcus aureus*, at least by 87% over its surface.

BACKGROUND OF THE INVENTION

Epidemiological data from Europe, North America, and Australia indicate that bacteria and viruses cause the spread of a significant percentage of contagious diseases from one person to another. One way by which bacteria or viruses are transmitted is through direct contact with contaminated metal surfaces; for example supermarket shopping carts, bus handrails, and metal structures on recreational parks, etc. In fact, supermarket shopping carts and bus handrails are among the five most heterotrophic bacteria-contaminated sites. These structures are generally made of steel with a metal coating such as chrome (Cr), nickel (Ni) or zinc (Zn).

Zn coatings are widely known to be most used to protect steel surfaces as they are more resistant to environmental corrosion than the steel substrate itself.

Moreover, as Korai. H has pointed out in "Current situation and future of inorganic antimicrobial agent", J. Inorg. Mater. Jpn. 6 (1999) 428-436; over the last few years, inorganic antibacterial agents have attracted the attention of researchers due to their heat resistance and persistence of their antibacterial effects compared with organic antibacterial agents.

According to that stated by N. Grier in "Silver and its compounds, In: Lea and Febiger (Eds), Disinfection, Sterilization and Preservation, Block SS", Philadelphia, 1993, pp 375-389; since the nineteenth century, silver (Ag)-based compounds have been used in many antibacterial applications, for example, colloidal silver has been used in wound antisepsis, and in combination with citrate salts, for the treatment of skin infections. Also, silver nitrate has been employed almost 100 years ago for the treatment of ophthalmia neonatorum. For this reason, silver nanoparticles are currently used in several physical, biological and pharmaceutical applications.

The antibacterial properties of silver particles against Gram-negative and Gram-positive bacteria have been widely demonstrated by many authors, for example D. G. Ahearn, et al., "Adherence of organisms to silver-coated surfaces", J. Ind. Microbiol. 15 (1995) 372-376; Hyung-Jun Jeon, et al., "Preparation and antibacterial effects of Ag—SiO2 thin films by sol-gel method", Biomaterials 24 (2003) 4921-4928; L. Zhao, et al., "Antibacterial nano-structured titania coating incorporated with silver nanoparticles", Biomaterials 32 (2011) 5706-5716; P. J. Kelly, et al., "A study of the antimicrobial and tribological properties of TiN/Ag nanocomposite coatings", Surf. Coat. Technol. 204 (2009) 1137-1140, and I. Sondi and B. Salopek-Sondi "Silver nanoparticles as antimicrobial agent: a case study on *E. coli* as a model for Gram-negative bacteria", J. Colloid Interface Sci. 275(2004) 177-182; among others.

For this reason, silver particles (AgPs) are used in a wide variety of applications such as athletic apparel manufacturing, washing machines, food packaging materials, and importantly, in the medical field as bactericides and therapeutic agents.

AgPs are also used in the manufacture of dental devices, as bactericidal coatings in water filters, and as antibacterial agents in air, sanitizer sprays, pillows, respirators, socks, wet wipes, detergents, soaps, shampoos, toothpastes, and many other consumer products. AgPs are also used as antibacterial agents in many public places such as railway stations and elevators in China, wherein they have demonstrated to exhibit good antibacterial activity.

Over the last few years, with regard to coatings, the trend has been directed to the development of metal and polymer coatings with antibacterial properties.

In the present invention, an electroplating process is used to form metal composite coatings containing an occluded antibacterial metal such as silver or copper, homogeneously dispersed throughout the coating. Unlike other processes disclosed in the mentioned patents, which only form an antibacterial agent film onto the coating surface or have the problem of particle agglomeration, in the present invention the antibacterial agent, namely silver particles (AgP's), is homogeneously occluded in the metal matrix, thus forming part of the metal coating. The metal composite coating obtained by electroplating process meets the high aesthetic standards required for decorative finishings including, but not limited to, brightness, high corrosion resistance, high hardness as well as the ability to prevent and inhibit bacteria growth, and/or remove both bacteria types: Gram-negative such as *Escherichia coli*, and Gram-positive such as *Staphylococcus aureus*, at least by 87% over its surface.

Antibacterial agents are known to be added to several metals surface such as: stainless steel sheets, chromium coatings or zinc coatings by using the thermal spraying technique, as disclosed in Patent documents WO 2010069104A1, US 2012/0225312A1 and WO 2012122666A1. However, the thermal spraying process has the main disadvantage of being highly expensive, in addition to the fact that some of the metal characteristics such as brightness and adherence are altered by the formed antimicrobial film.

Thermosetting resin compositions containing antimicrobial agents have also been developed to be used as coating materials for several metals such as: iron, aluminum, copper and stainless steel, as disclosed in Patent documents WO 2013052683A2, WO 2012158702A2, WO 2003043745A1 and WO 2013033802A1. However, said resin compositions include particulate materials such as zeolites and oxides which can be undesired materials on the article surface, for example, functional or decorative items, which have high aesthetic requirements.

In patent document WO 1999025898A1, a simple process for forming antimicrobial films is used. In this process, from a solution containing the antimicrobial components, which may be organic or inorganic, a thin film is applied to the metal surface and is pressurized, without heating, in order to form the antibacterial coating.

Another process for forming antibacterial coatings is electroplating. In patent document WO 2009120784A2 the electroplating is used to make antibacterial coatings from antibacterial organic agents dispersed on the coating surface. Likewise, in patent documents EP 2438216A1 and EP 2522377A1, electroplating is used as a process of forming amorphous coatings from cobalt (Co) having antibacterial properties.

In patent document WO 2012135107A2, a silver (Ag) film is electroplated over stainless steel to form materials which can be used as implants. In this regard, metals such as silver and copper or their oxides are considered as antimicrobial agents and they are known as antibacterial metals. Antibacterial metals are those which inhibit the growth of bacteria or kill them and which are preferably biocompatible. Preferred biocompatible antibacterial metals include: silver (Ag), gold (Au), copper (Cu), platinum (Au), palladium (Pd), and iridium (Ir) (noble metals).

In patent document WO 2004101014A2, oxidized silver species are chemically deposited on a surface to form antibacterial coatings having an application in medical material development. In addition, in patent document WO 2007097790A1 silver oxides like AgO and Ag2O are deposited on polymeric surfaces by using the ion plasma deposition technique (IPD).

Moreover, M. K. PunithKumar and CH. Srivastava (2013) "Morphological and electrochemical characterization of electrodeposited Zn—Ag nanoparticle composite coatings, Materials characterization 85 (2013) 82-91", report the co-deposition of Ag nanoparticles in a zinc matrix in order to increase corrosion resistance of the zinc coating; however, as textually mentioned, there is an agglomeration of silver nanoparticles that influence the surface morphology.

In the present invention, the antimicrobial properties of silver particles (AgPs) are combined with the protective capacity of Zn coatings to form Zn/AgPs composite coatings, wherein the silver particles become occluded in the zinc metal coating matrix without losing their antibacterial properties, thus forming part of the coating instead of a surface film; in this way, hygienic metal coatings are formed. The combination of the antimicrobial properties of silver particles (AgPs) with the protective capacity of Zn coatings enables the possibility of a number of novel applications for Zn/AgPs composite coatings in the biomedical field, food processing, among others.

Patent document MX/a/2014/004215 discloses electrolytic bath to electroplate a metal composite of Nickel-Phosphorus-metal nano-particles of an antibacterial metal (Ni—P-MANPs), comprising salts such as sulfamates of Ni2+ ion to be electroplated, a pH buffering agent, a phosphorus-containing acid and also containing antibacterial metal nano-particles (MANPs). While it has been possible to achieve homogeneous occlusion of silver nanoparticles in metal coatings of nickel; by adapting the composition of electrolytic bath proposed in said patent document to zinc baths, opaque (not shiny) coatings having holes or imperfections caused by the agglomeration of particles on its surface are obtained.

Technical Problem to be Solved

The processes currently known as thermal spraying or resin incorporation and even the electroplating process change the surface properties such as: brightness, wear resistance, corrosion resistance, adhesion, brittleness. Furthermore, they do not solve the problem of achieving a homogeneous dispersion in electrolytic acid zinc baths allowing homogeneous incorporation of metal particles with antibacterial effects homogeneously in the composition of electrolytic acid zinc coatings, since the silver particles agglomerate, thereby depositing on the substrate surface in the form of granules. For this reason, the coatings obtained by said process are opaque and have surface imperfections.

BRIEF DESCRIPTION OF THE INVENTION

The present invention consists of an electrolytic bath for electroplating a metal composite of zinc-antibacterial metal particles (Zn-AMPs) comprising salts such as chloride ions of $Zn^{2+}$ to be deposited, a pH buffering agent, it also contains Antibacterial Metal Particles (AMP) having an average size between 10 and 100 nanometers (nm) and which may be silver (Ag) or copper (Cu) particles, the occlusion of AMPs in the coating metal matrix provides the metal composite coating with antibacterial properties, in addition, it contains a surfactant which allows the AMPs to be stable in the suspension, and it makes their occlusion in the composite metal matrix easier during the metal ion electroplating.

The composite coatings thus obtained from the electrolytic bath are able to prevent, inhibit and/or remove both bacteria types: Gram-negative such as *Escherichia coli*, and Gram-positive such as *Staphylococcus aureus*, at least by 87% over its surface.

The present invention which consists of an electrolytic bath for obtaining, by electroplating, metal composite coatings of Zn-AMP, was developed based on the following considerations: the metal ion salts to be deposited, which may be chlorides, have the function of providing $Zn^{2+}$ ions. Also, the occlusion of Antibacterial Metal Particles (AMPs) in the coating metal matrix provides said coating with antibacterial characteristics.

An important point in the instant invention is the use of a cationic surfactant, which may be cetyltrimethylammonium hydrogensulfate (CTAHS), cetyltrimethylammonium bromide (CTAB), cetyl pyridium bromide (CPBR) or cetyl pyridium chloride (CTCL), which stabilizes AMP's in the suspension and gives them a positive charge, which promotes the occlusion of particles in the metal matrix during electroplating process, thus producing metal composite coatings that are homogeneous in composition.

The composites coatings obtained from the electrolytic bath have an AMP content between 2.6 and 14.1 $mg/cm^3$ in the metal matrix and a Zinc content between 97.4 and 85.9%, depending on the electroplating conditions.

The assessment of the antibacterial ability of the coatings with regard to *Staphylococcus aureus* and *Escherichia coli* bacteria was carried out according to the Mexican Official Standard NOM-109-SSA1-1994.

The results showed that Zn-AMP coatings inhibit the growth of *Escherichia coli* bacteria between 87 and 97% and for *Staphylococcus aureus* bacteria between 87 and 96% depending on the concentration of Antibacterial Metal Particles (AMPs) in the coating.

DETAILED DESCRIPTION OF THE INVENTION

In the present invention an electrolytic bath is used, which contains:

$Zn^{2+}$ ions at a concentration of between 50 and 300 g/L, preferably a concentration of 85 g/L. $Zn^{2+}$ ions are added to the electrolyte solution from a soluble salt of zinc chloride hexahydrate ($ZnCl_2.6H_2O$), which is commercially available.

Potassium chloride, which acts as conductive salt is found at concentrations of from 200 to 220 g/L, preferably a concentration of 208 g/L. The final pH is adjusted to 5.0, preferably using hydrochloric acid or sodium hydroxide, as appropriate. The electrolytic bath is controlled at a temperature between 21 and 35° C.; particularly satisfactory results are obtained at 25° C.

A buffering agent for controlling pH of the solution. Said buffering agent is boric acid ($H_3BO_3$) and its concentration is about 8.5 to 45.0 g/L, preferably a concentration of 25.0 g/L.

A non-toxic, inorganic antibacterial agent which is biocompatible with the environment during all the time of use. The antibacterial agent used does not affect the aesthetic finishing of the electroplated metal coating.

The antibacterial agents intended to be used in the formulation of the present invention include antibacterial metals such as: silver or copper particles having a size between 10 and 100 nanometers, at a concentration of between 3.0 and 10 g/L, wherein the most suitable concentration depends on the current density applied to the coating formation. The occlusion in the metal matrix of antibacterial agent nanoparticles provides the coating with the antibacterial characteristic. Silver or copper particles are commercially available.

A polyethoxylated polymer compound which acts as leveler, having the following structural formula:

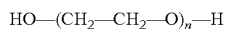

HO—(CH$_2$—CH$_2$—O)$_n$—H

The molecular weight of polyethoxylated polymer compound may range between 400 and 20,000 grams/mole. Levelers are primary additives whose function is to allow smooth deposits to be obtained in the bath. They are used in the baths in an effective amount to obtain the desired brightness.

The absence of polyethoxylated compounds in the electrolytic bath composition causes burnt (dark), dendritic, porous and poorly adherent deposits to be obtained.

In one preferred embodiment, the polyethoxylated polymer is polyethylene glycol having a molecular weight of between 1,000 and 8,000 g/mol. The concentrations of said component can range between 1 and 5 g/L, preferably a concentration of 1.5 g/L.

Said bath further contains as a brightening additive; an unsaturated aromatic ketone having the following structural formula:

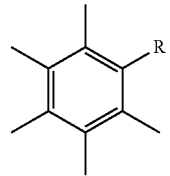

wherein R is: (—CH=CH—CO—CH$_3$).

Said brightening additive is an additive which has the function of refining the grain size of the deposits and allow smooth textured deposits to be obtained. Said brightening additive is used in electrolytic baths in an effective amount to decrease the grain size of the deposits.

In one preferred embodiment, said unsaturated aromatic ketone is benzylideneacetone at a concentration of from 0.01 to 2 g/L, preferably the concentration is 0.20 g/L.

The use of other common additives is also necessary in the acid baths of zinc; among said additives are sodium benzoate at concentrations of from 0.5 to 1.75 g/L, preferably 0.75 g/L, and triethanolamine at concentrations of from 1.5 to 4.8 g/L, preferably 2.80 g/L. The function of sodium benzoate is mixed since it contributes to obtaining bright deposits and avoids passivation of the anode. Its absence in deposition baths causes a loss of brightness in deposits and the formation of a dark layer on the anode due to the accumulation of oxidation products. Triethanolamine acts as a brightener, thus yielding brighter deposits when used at an effective concentration.

A cationic surfactant agent having as main function to form a stable suspension with the antibacterial metal particles; also, the cationic nature of the surfactant provides the particles with a positive charge, which makes easier to electrostatically attract said particles to the cathode surface during the electroplating process, and promotes the particles occlusion in the metal matrix, thus producing homogeneous coatings in composition. The surfactant agent used does not affect the aesthetic finishing of the electroplated metal composite coating. The surfactant taken into consideration is cationic-type, and it may be cetyltrimethylammonium hydrogensulfate (CTAHS), cetyltrimethylammonium bromide (CTAB), cetyl pyridium bromide (CPBR) or cetyl pyridium chloride (CTCL). The concentration is between 0.05 and 50 mM, preferably 0.1 mM.

By suitably combining the surfactant and antibacterial metal nanoparticles, the chemical effect of stabilizing the silver particles suspension in the electrolytic bath was achieved as well as obtaining smooth, shiny composite coatings having homogeneous chemical compositions and antibacterial activity.

The electrolytic bath can be operated in a range of current densities of from 0.01 to 0.05 A/cm$^2$. The optimal current density for the bath operation depends on the AMPs concentration used.

The electroplating duration may range depending on the bath composition, current density used, and desired thickness of the coating. The metal substrate to be coated can be cathodically electrified using a power source and Zinc-soluble anodes.

The bath and method of the present invention are characterized by their versatility, easy control, stability, and they are particularly suitable for obtaining antibacterial metal composite coatings of (Zn/AMP) in hanging, in spite of the geometry of the parts to be coated.

Best Way to Carry Out the Invention

In order to illustrate the composition of the electrolytic bath for electroplating Zn/AMP metal composites in the present invention, the following examples are shown. The examples are provided to illustrate the method and do not represent limiting conditions for the invention. Likewise, in the examples, AMP=AgPs The obtained coatings were adhesive and brightful. The silver concentration in the coatings was determined by using the analysis technique known as Inductively Coupled Plasma "ICP" spectroscopy and the obtained results are shown in Table 2.

The microbiological analysis was performed according to the Mexican Official Standard NOM-109-SSA1-1994 initially and for contact times of 1, 15, and 30 minutes (min) between Zn-AgPs coating and solutions contaminated with *Escherichia coli* and *Staphylococcus aureus*. Table 2 shows the obtained results in Colony Forming Units (CFU).

TABLE 2

Results of AgPs concentration and antibacterial effect in final coatings

| Zn—AgPs coating No. | AgPs concentration in coatings (mg/cm$^3$) | Amount of *Staphylococcus aureus* bacteria (CFU) by contact time | | | Amount of *Escherichia coli* bacteria (CFU) by contact time | | |
|---|---|---|---|---|---|---|---|
| | | Initial 0 min | 1 min | | Initial 0 min | 1 min | Initial 0 min | 1 min |

| coating No. | (mg/cm$^3$) | Initial 0 min | 1 min | | | Initial 0 min | 1 min | Initial 0 min | 1 min |
|---|---|---|---|---|---|---|---|---|---|
| 1 | 4.3  | 123 ± 5 | 9 ± 1  | 9 ± 1  | 7 ± 1 | 156 ± 4 | 11 ± 1 | 13 ± 1 | 2 ± 1 |
| 2 | 5.6  | 125 ± 3 | 12 ± 1 | 10 ± 1 | 4 ± 1 | 154 ± 3 | 10 ± 1 | 10 ± 1 | 2 ± 1 |
| 3 | 6.0  | 124 ± 5 | 12 ± 1 | 16 ± 2 | 5 ± 1 | 154 ± 3 | 12 ± 1 | 11 ± 1 | 1 ± 1 |
| 4 | 6.4  | 122 ± 3 | 12 ± 1 | 15 ± 1 | 5 ± 1 | 152 ± 3 | 10 ± 1 | 10 ± 1 | 2 ± 1 |
| 5 | 9.3  | 123 ± 3 | 14 ± 1 | 11 ± 1 | 5 ± 1 | 154 ± 4 | 17 ± 1 | 14 ± 1 | 3 ± 1 |
| 6 | 14.1 | 122 ± 3 | 8 ± 1  | 11 ± 1 | 6 ± 1 | 152 ± 4 | 17 ± 1 | 14 ± 1 | 2 ± 1 |

Example 1

An electrolytic suspension (solution A) containing 81.0 g/L ZnCl$_2$.6H$_2$O+208.80 g/L KCl+25 g/L H$_3$BO$_3$+0.75 g/L sodium benzoate+0.2 g/L benzylideneacetone+1.5 g/L PEG+2.8 g/L triethanolamine+2.5 g/L silver particles (AgPs)+x mM cetyltrimethylammonium hydrogensulfate was prepared, where x=0.05, 0.1, 0.5, 1.0, 10, or 50. The pH of electrolyte is adjusted to 5.5 using a 5 vol % solution of sodium hydroxide (NaOH). The electrolytic suspension was controlled at a temperature of 25° C.; an AISI 1018 steel plate was used as the cathode, and a zinc-soluble anode was used as the anode.

From the above solution six Zn-AgPs coatings were formed (coatings 1, 2, 3, 4, 5, and 6) using six different values of concentrations of cetyltrimethylammonium hydrogensulfate (CTAHS) and a current density of 0.021 A/cm2, using AISI 1018 steel plates as the cathode, with an exposed area of 15 cm$^2$, according to that shown in Table 1. The coatings were made in triplicate.

TABLE 1

Operation conditions of electrolytic bath

| Zn—AgPs Coating No. | Temperature (±1° C.) | Electrolyte pH | CTAHS concentration in bath [mM] | Average thickness of obtained coating (±2 μM) |
|---|---|---|---|---|
| 1 | 25 | 5.0 | 0.05  | 15 |
| 2 | 24 | 5.0 | 0.10  | 16 |
| 3 | 24 | 5.0 | 0.50  | 16 |
| 4 | 25 | 5.0 | 1.00  | 15 |
| 5 | 25 | 5.0 | 10.00 | 13 |
| 6 | 25 | 5.0 | 50.00 | 13 |

Example 2

An electrolytic suspension (solution B) containing 81.0 g/L ZnCl$_2$.6H$_2$O+208.80 g/L KCl+25 g/L H$_3$BO$_3$+0.75 g/L sodium benzoate+0.2 g/L benzylideneacetone+1.5 g/L PEG+2.8 g/L triethanolamine+0.1 mM cetyltrimethylammonium hydrogensulfate+x g/L silver particles (AgPS) (average size 50 to 60 nanometers (nm)), where x=0.5, 1.5, 2.5, 3.5, 4.5 g/L was prepared. The pH of electrolyte is adjusted to 5.0 using a solution of sodium hydroxide (NaOH) at 5% by volume.

The electrolytic suspension was controlled at a temperature of 25° C.; an AISI 1018 steel plate was used as the cathode, and a zinc-soluble anode was used as the anode.

From the previous solution, five Zn-PMA coatings were formed (coatings 7 to 11), using AISI 1018 steel plates as the cathode with an exposed area of 15 cm$^2$, according to that shown in Table 3. The coatings were made in triplicate.

TABLE 3

Operation conditions of electrolytic bath

| Zn—AgPs coating No. | Temperature (±1° C.) | Electrolyte pH | AgPs concentration in bath (g/L) | Average thickness of obtained coating (±2 μm) |
|---|---|---|---|---|
| 7  | 25 | 5.5 ± 0.2 | 0.5 | 15 |
| 8  | 25 | 5.5 ± 0.1 | 1.5 | 16 |
| 9  | 25 | 5.5 ± 0.1 | 2.5 | 13 |
| 10 | 25 | 5.5 ± 0.2 | 3.5 | 15 |
| 11 | 25 | 5.5 ± 0.1 | 4.5 | 14 |

The obtained coatings were adhesive and brightful. The silver concentration in the coatings was determined by using the analysis technique known as Inductively Coupled Plasma "ICP" spectroscopy and the obtained results are shown in Table 4.

The microbiological analysis was performed according to the Mexican Official Standard NOM-109-SSA1-1994 initially and for contact times of 1, 15, and 30 minutes (min) between Zn-AgPs coating and solutions contaminated with *Escherichia coli* and *Staphylococcus aureus*. Table 4 shows the obtained results in Colony Forming Units (CFU).

TABLE 4

Results of AgPs concentration and antibacterial effect in final coatings

| Zn—AgPs coating No. | AgPs concentration in coatings (mg/cm$^3$) | Amount of *Staphylococcus aureus* bacteria (CFU) by contact time | | | | Amount of *Escherichia coli* bacteria (CFU) by contact time | | | |
|---|---|---|---|---|---|---|---|---|---|
| | | Initial 0 min | 1 min | | | Initial 0 min | 1 min | | |
| 7 | 2.56 | 156 ± 5 | 26 ± 1 | 21 ± 1 | 12 ± 1 | 154 ± 5 | 26 ± 1 | 19 ± 1 | 5 ± 1 |
| 8 | 4.23 | 163 ± 3 | 25 ± 1 | 26 ± 1 | 10 ± 1 | 181 ± 3 | 24 ± 1 | 21 ± 1 | 9 ± 1 |
| 9 | 5.70 | 154 ± 5 | 27 ± 1 | 20 ± 2 | 7 ± 1 | 184 ± 5 | 14 ± 1 | 21 ± 1 | 7 ± 1 |
| 10 | 6.59 | 181 ± 3 | 27 ± 1 | 20 ± 1 | 8 ± 1 | 184 ± 3 | 14 ± 1 | 28 ± 1 | 8 ± 1 |
| 11 | 6.92 | 123 ± 3 | 31 ± 1 | 26 ± 1 | 8 ± 1 | 181 ± 3 | 12 ± 1 | 15 ± 1 | 9 ± 1 |

In view of all of the above-mentioned, the present invention proposes the composition of an electrolytic bath, which by using the electroplating process, can be applied onto electrified metal substrates in order to obtain a Zn-AMP metal composite coating having homogeneous composition throughout the coating thickness, and having ability of preventing or inhibiting bacteria growth and/or remove both bacteria types: Gram-negative such as *Escherichia coli*, and Gram-positive such as *Staphylococcus aureus*, at least by 87% over its surface.

The present invention has been described enough for a person of ordinary skill in the art to reproduce and obtain the results disclosed herein. However, any person skilled in the technical field related to the present invention can be able to make non-described modifications in the present application; however, if for the implementation of said modifications in composition, the matter claimed in the following claims is required, such compositions should be encompassed by the scope of the present invention.

The invention claimed is:

1. An electrolytic bath composition for obtaining antibacterial metal composite coatings of zinc-antibacterial metal particles (Zn/AMP), comprising an ion source of zinc ions, antibacterial metal particles, a pH buffering agent, polyethylene glycol, benzylideneacetone, sodium benzoate, triethanolamine, and a cationic surfactant, wherein the electrolytic bath has a pH between 2 and 6, and wherein the cationic surfactant is selected from cetyltrimethylammonium hydrogensulfate (CTAHS), cetyl pyridium bromide (CPBR), or cetyl pyridium chloride (CTCL).

2. The electrolytic bath composition according to claim 1, wherein the ion source of zinc ions are zinc chloride hexahydrate (ZnCl$_2$.6H$_2$O) salts.

3. The electrolytic bath composition according to claim 2, wherein the concentration of zinc chloride hexahydrate (ZnCl$_2$.6H$_2$O) is 50 to 300 g/L.

4. The electrolytic bath composition according to claim 1, wherein the antibacterial metal particles are silver or copper particles.

5. The electrolytic bath composition according to claim 1, wherein the antibacterial metal particles are present at a concentration between 3.0 and 10 g/L.

6. The electrolytic bath composition according to claim 1, wherein the size of the antibacterial metal particles is between 10 to 100 nanometers.

7. The electrolytic bath composition according to claim 6, wherein the size of the antibacterial metal particles is 60 nanometers.

8. The electrolytic bath composition according to claim 1, wherein the cationic surfactant is cetyltrimethylammonium hydrogensulfate (CTAHS).

9. The electrolytic bath composition according to claim 1, wherein the cationic surfactant is present at a concentration of between 0.05 and 50 mM.

10. The electrolytic bath composition according to claim 9, wherein the cationic surfactant is present at a concentration of 0.1 mM.

11. The electrolytic bath composition according to claim 1, wherein the pH buffering agent is boric acid (H$_3$BO$_3$).

12. The electrolytic bath composition according to claim 11, wherein the boric acid (H$_3$BO$_3$) is present at a concentration between 8.5 to 45.0 g/L.

13. The electrolytic bath composition according to claim 12, wherein the boric acid (H$_3$BO$_3$) is present at a concentration of 25 g/L.

14. The electrolytic bath composition according to claim 1, wherein the polyethylene glycol has a molecular weight of between 4 000 and 10 000 g/mol.

15. The electrolytic bath composition according to claim 1, wherein the polyethylene glycol is present at a concentration of between 1 to 5 g/L.

16. The electrolytic bath composition according to claim 15, wherein the polyethylene glycol is present at a concentration of 1.5 g/L.

17. The electrolytic bath composition according to claim 1, wherein the benzylideneacetone is present at a concentration of between 0.01 to 2 g/L.

18. The electrolytic bath composition according to claim 17, wherein the benzylideneacetone is present at a concentration of 0.2 g/L.

19. The electrolytic bath composition according to claim 1, wherein the sodium benzoate is present at a concentration of between 0.5 to 1.75 g/L.

20. The electrolytic bath composition according to claim 19, wherein the sodium benzoate is present at a concentration of 0.75 g/L.

21. The electrolytic bath composition according to claim 1, wherein the triethanolamine is present at a concentration of between 1.5 to 4.8 g/L.

22. The electrolytic bath composition according to claim 21, wherein the triethanolamine is present at a concentration of 2.80 g/L.

23. The electrolytic bath composition according to claim 3, wherein the concentration of zinc chloride hexahydrate (ZnCl$_2$.6H$_2$O) is 85.0 g/L.

* * * * *